United States Patent [19]

Bhilotra

[11] 4,075,067
[45] Feb. 21, 1978

[54] PRODUCTION OF ALUMINIUM
[75] Inventor: Kaloo Raj Kumar Bhilotra, Arvida, Canada
[73] Assignee: Alcan Research and Development Limited, Montreal, Canada
[21] Appl. No.: 659,773
[22] Filed: Feb. 20, 1976
[30] Foreign Application Priority Data
Feb. 25, 1975   United Kingdom ............... 7918/75
[51] Int. Cl.² ............................................. C25C 3/06
[52] U.S. Cl. .................................................. 204/67
[58] Field of Search ........................... 204/67; 264/117
[56] References Cited
U.S. PATENT DOCUMENTS

| 1,534,031 | 4/1925 | Frary | 204/67 |
|---|---|---|---|
| 3,353,910 | 11/1967 | Cornelius et al. | 23/141 |
| 3,664,935 | 5/1972 | Johnson | 204/67 |
| 3,795,724 | 3/1974 | Paul et al. | 264/117 |

FOREIGN PATENT DOCUMENTS

| 283,949 | 5/1928 | United Kingdom | 204/67 |

Primary Examiner—John H. Mack
Assistant Examiner—H. A. Feeley
Attorney, Agent, or Firm—Cooper, Dunham, Clark, Griffin & Moran

[57] ABSTRACT

In the production of alumina for supply to electrolytic reduction cells in the production of aluminum metal, alumina trihydrate is calcined in a calcination furnace to convert it to alumina, typically having a water content of less than 2%. In the course of this operation fine particles in a size range below 44 microns are separated from the exhaust gases from the calciner. In conventional procedures these particles which are only partially dehydrated, are either recycled to the calciner or directly added to the calciner product alumina. With the dual objective of reducing environmental pollution and saving valuable alumina the present invention converts these collected fines into compacted granules in a size range of 150–5000 microns for supply to an electrolytic reduction cell either directly or after readmixture with the calciner product alumina.

12 Claims, 1 Drawing Figure

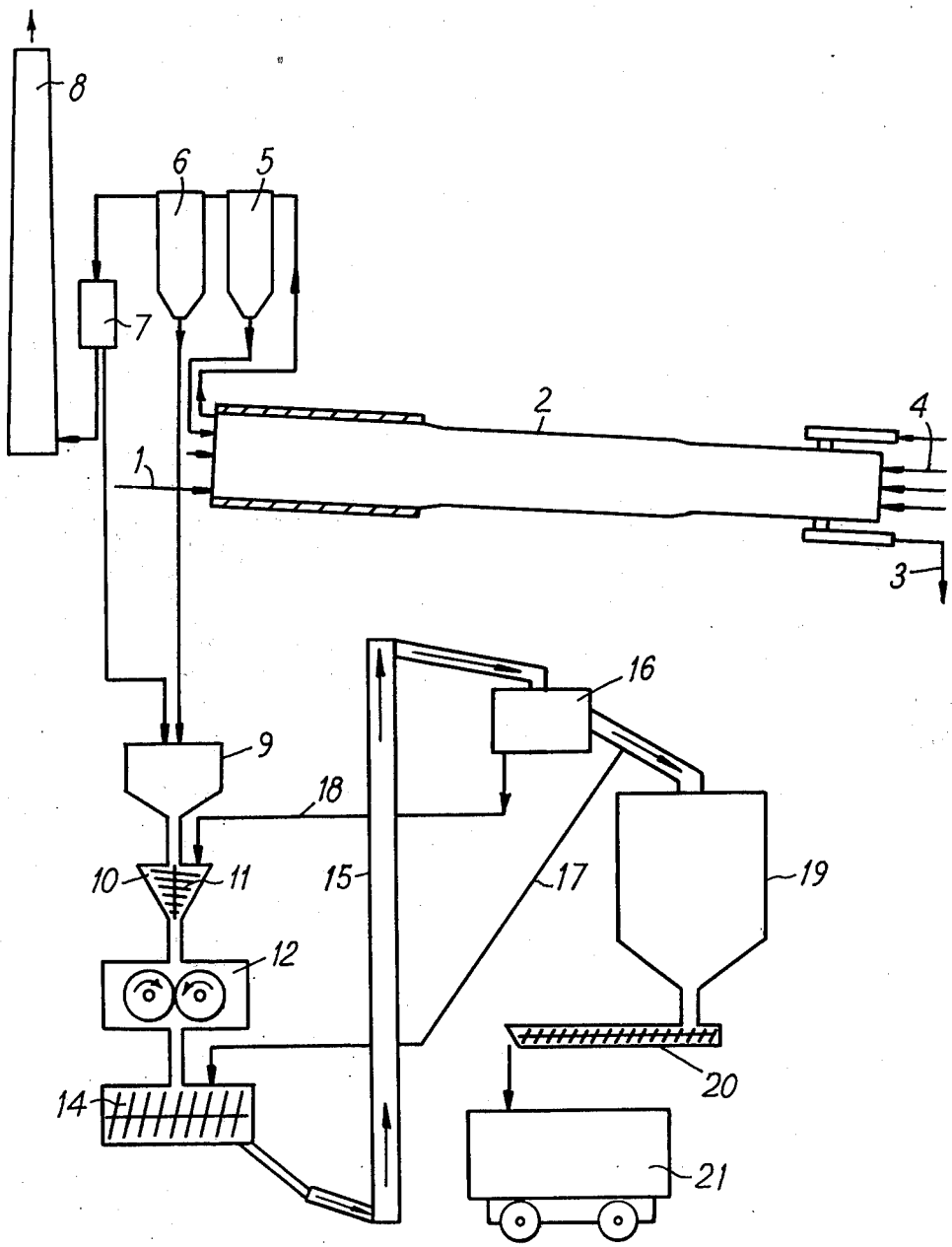

PRODUCTION OF ALUMINIUM

The present invention relates to the production of aluminum. Alumina for the production of aluminum is typically extracted from bauxite ores by means of the Bayer process. In this process the ore is digested at elevated temperature and pressure with caustic soda liquor to extract alumina hydrate from the bauxite by conversion to soluble sodium aluminate.

As is well known, alumina trihydrate is precipitated from the sodium aluminate solution by seeding the solution with fine alumina trihydrate particles whilst at the same time cooling the solution.

The alumina trihydrate, taken off as product at the precipitation stage, is subjected to calcination to drive off combined water and thus convert the trihydrate to calcined alumina, suitable for feeding to electrolytic reduction cells.

In the electrolytic reduction cell alumina is reduced by the passage of very high currents at low voltage through the electrolyte which consists of a solution of alumina in an electrolyte composed of NaF and $AlF_3$ in predetermined proportion. The current passes between one or more overhead carbon anodes and a cathode which forms the lining for the cell. A crust of frozen electrolyte forms on the top of the cell. Fresh feed alumina is placed on the top of the crust and is introduced into the molten electrolyte by breaking the crust periodically to replenish the alumina content.

It is well recognized that alumina for that purpose should as far as possible be in the form of a coarse, fully calcined, free-flowing powder to avoid the formation of undesirable hard crusts on the surface of the molten electrolyte in such cells.

It has always been considered that the particles should be coarse so as to avoid the formation of agglomerates which form when fine particles are introduced into a liquid which does not readily wet them. It has been considered that the introduction of fine particles, which form into agglomerates, will lead to cell operation difficulties, such as the formation of excessive sludge or muck in the bottom of the cell through failure of the agglomerates to dissolve. It has therefore been considered that, while the alumina particles should be coarse they should also not be in excess of about 150 microns (100 mesh), since larger particles would be difficult to dissolve in the molten electrolyte of the reduction cell.

It has always been considered desirable that the alumina added to an electrolytic reduction cell should have a very low residual combined water content in order to avoid loss of fluoride values from the electrolyte of the bath by reason of formation of hydrogen fluoride by reaction of the cell electrolyte with water. Typically the combined water content of cell-grade alumina has been held below 2%. Such a grade is considered to be essentially free of combined water.

The calcination of alumina trihydrate is normally carried out at a temperature of the order of 1100° C. in a rotary kiln or fluidized bed calciner to produce a sandy, free-flowing type of alumina. Where a floury alumina, consisting essentially of $\alpha$-alumina, is desired, the calcination is carried out at a temperature of 1200° C or higher. In both cases very substantial quantities of fine particles become entrained in the exhaust gas from the calciner and usually these particles are somewhat less than fully converted to alumina because these fine particles have a relatively short dwell time in the calciner before becoming entrained in the exhaust gas stream. The fines are separated from the exhaust gas to avoid atmospheric pollution by means of cyclone-type mechanical precipitators or electrostatic precipitators and for reasons of economy the thus collected fines are added back to the bulk of coarser alumina particles taken off from the calciners or are fed back to the calciners. Where the presence of these fines in the calcined alumina is found objectionable it is usual to operate the Bayer process so that the product alumina trihydrate particles contain less than about 15% by weight of particles less than 44 microns in size, although it is well known that the efficiency of the Bayer process may be somewhat increased if a higher proportion of fine alumina trihydrate particles is accepted in the product. In a typical rotary kiln operation the fines separated from the exhaust gas constitute 3 – 10% of the alumina and typically a major portion by weight have a range of sizes below 44 microns, although 10% or more may be somewhat above 44 microns. Since these particles are only partially calcined they have the effect of raising the water content of the calcined alumina from about 1% to nearly 2%. The water content of these collected fines may range from about 5% up to about 25%. Where the calciner is of the fluidized bed type, the proportion of the collected fines may be substantially larger because of the greater breakdown of agglomerated alumina trihydrate particles during calcination in that equipment but their water content is usually lower.

The presence of fine particles, such as particles below 44 microns, in the product gives rise to numerous problems at subsequent stages. By virtue of the presence of these fines, alumina is a very dusty product to handle, both in transit from the Bayer process plant to the electrolytic reduction cell and in the course of reduction cell operations. Substantial quantities of fines become entrained in the exhaust gases from the reduction cells, giving rise to further problems in the control of atmospheric pollution. Detailed studies have revealed that up to one half of the fines lost at various stages between the Bayer process plant and final reduction to aluminum are due to the collected fines which are added back to the alumina product from the calciner or returned to the calciner. These losses are reduced to about one half where the collected fines are not added back to the calciner product which itself has a content of up to 10% particles below 44 microns (but these are fully calcined due to longer residence in the calciner). These losses, which consist principally of particles in a size range below 44 microns, occur as dust either in transit or in the operation of the electrolytic reduction cells, so that the presence of such fines in the alumina leads not only to a technically inferior product (because of the dust problems arising in transit and difficulties in the operation of the reduction cells), but also to a substantial loss of increasingly valuable alumina.

The bulk of the losses of dust occur in the electrolytic reduction plant. It has been estimated that up to 50% of the loss occurs during and after transfer of the calcined alumina from the storage bins to the crust of the reduction cells, including very substantial quantities of fines, lost in the off-gases from the cells or entrapped in the cell lining. Additionally large quantities of dust are lost in transferring calcined alumina to the electrolytic reduction plant from the calciner of the alumina plant. Where the electrolytic reduction plant is remote from the alumina plant, substantial quantities of dust are lost at the points of loading and unloading of the alumina from ships and/or land vehicles. Thus the purchase of alumina of reduced fines content represents a substantial direct economic advantage for the user as well as an indirect economic advantage in avoiding pollution from alumina dust.

According to a first feature of the present invention a fine particles fraction, having a major proportion by weight of particles of less than 44 microns by size is collected from the exit gas stream in the calcination stage and subjected to compaction to form the same into discrete coarse granules. This fine particles fraction is usually not fully calcined (is only partially dehydrated) and typically has a combined water content in a range of about 5 – 20% although in a multi-stage collection system, the finest fraction collected in an electrostatic precipitator may have a water content as high as 25%. It is found that these coarse granules may be employed in amounts of up to 50% and even up to 75% of the total alumina requirements of a reduction cell without leading to undue difficulties in operation. However on a continuous basis it would be preferred to confine the use of such granules to less than 25% and preferably to not more than about 10% of the total charge to the cell. It is one of the surprising features of the present invention that coarse granules up to about 5 mms (5000 microns) in size and including up to 25% of combined water can be successfully added to the electrolyte of a reduction cell without giving rise to an accumulation of undissolved muck in the bottom of the cell, i.e., not substantially in excess of the muck which collects in such a cell when using alumina produced by conventional methods. It is also found possible to entrain these granules in the exhaust gas stream from an electrolytic reduction cell to perform a "dry scrubbing" operation for recovery of fluorine values before the alumina is added to the cell.

Whereas it has normally been thought necessary to keep the water content of the alumina at below 2%, tests have been performed employing up to 75% of granules, having a water content of 11 – 12%, corresponding to a water content of 9 – 10% for the whole alumina charge. Although the emitted fumes required collection to prevent working conditions becoming unpleasant at crust-breaking, the electrolytic operation of the cell was substantially unaffected.

The pressure compaction of the alumina calciner fines to form granules of the desired final size is readily achievable by use of commercially available roll-type compaction machines to form relatively large pellets or continuous sheets which are then broken down to appropriate granule size by use of standard granulation machinery. Conveniently the compacted granules are sieved to pass 4 mesh (4760 microns), and to be retained on 100 mesh (150 microns). However, other classification standards may be conveniently adopted such as sieving to pass 8 mesh (2362 microns) and to be retained on 65 mesh (220 microns).

The calciner fines can be compacted at medium to high roll-loadings of the compaction machine without added binder material to form either discrete pellets or sheets. The particles may be compacted either in a fully cooled condition or whilst in a warm or hot condition such as at 180° C. No difficulty is experienced in compacting the material to form strong pellets, or sheets, which can be subjected to granulation techniques to form granules of the desired size range without simultaneous formation of excessive quantities of dust provided that steps are taken to perform the compaction operation on the particles in a thoroughly deaerated condition. Whilst it is unnecessary to employ any binder, it may in some circumstances be desirable to introduce a small amount of water or other suitable binder to assist the compaction operation. Calculations made from the loading forces applied to the rolls of the compaction apparatus indicates that the pressure applied to the alumina fines in the roll bite for the formation of pellets or corrugated sheets sufficiently strong for satisfactory granulation is of the order of 10 – 30, preferably 15 – 25 tons/square inch.

Although the compaction procedure may be applied to alumina calciner fines alone, it may in some circumstances be desirable to mix the fines with a proportion of fully calcined particles, taken from the calciner product. Alternatively, the compaction technique may be applied to the whole or a major part of the calciner product output where that contains a large proportion, such as 30% or more, of particles of a size less than 44 microns. In such a case a further sub-44 micron fraction may be obtained by air elutriation of the calciner product.

It has been found that granules formed wholly from collected calciner fines having a water content of up to 25% may be added without undue difficulty in amounts of at least 10% of the total alumina charged to an electrolytic reduction cell and indeed in even higher proportions, for example up to about 25% and even up to 50% or more in some circumstances, without causing excessive fuming through reaction of water with the fluoride electrolyte of the cell. As a consequence since the total collected fines arising from the operation of a rotary kiln calciner are normally only 3 – 10% of the calciner output, the fines collected from the exhaust gases may be disposed of in the form of granules in the operation of only a proportion of the cells normally supplied from the calciner and the remainder of the cells may be supplied with alumina, to which no collected fines have been added back, and which has in consequence a lower dust content. However in most instances the granules are added to the whole calciner output so as to constitute at least 2%. The calciner output is correspondingly depleted in fines, as compared with a product in which all the collected fines are added back.

Although the Bayer process is a very efficient process for the extraction of aluminum values from bauxite ores and leads to the production of alumina of sufficient purity to permit direct addition to the electrolytic reduction cells, nevertheless it is inevitable that some impurities are taken up into solution in the digestion stage and precipitated from the sodium aluminate solution with the alumina trihydrate. It has been found that the fines recovered from the exhaust gas emitted from a calciner (rotary kiln or fluidized bed-type calciner) contain a substantially larger proportion of the impurities such as Na, Si and Fe than are present in the coarse product output from the rotary kiln or other calcination furnace. Thus compacting separated fines into granules and maintaining the granules separate from the coarse calcination product provides a means of exercising a measure of control over the impurity level of the alumina added to the cells.

According to a further feature of the present invention therefore the granules of compacted fines are remixed with the coarse calcination product in different proportions so as to provide relatively high purity and relatively low purity alumina product fractions. According to a further alternative the compacted fines granules are maintained separate and may then be added as an appropriate proportion of the alumina feed to those electrolytic cells which are already yielding a relatively low purity product aluminum for reasons well understood in the art.

In order to obtain greater productivity from the Bayer process precipitation circuit, some alumina producers operate the process so as to obtain alumina trihydrate having a content of fine alumina trihydrate particles (less than 44 microns) forming up to 40% of the trihydrate fed to the calciner. Such trihydrates lead to a very high proportion of sub-44 micron particles in the particles recovered from the exhaust gases. The compaction technique of the present invention is particularly advantageous in such cases because it allows the high productivity of the precipitation circuit to be employed without experiencing the full disadvantages arising from the extreme dustiness of the product.

Thus in some circumstances it may be convenient to operate the precipitation stage in such a way that 10% by weight or more of the precipitated alumina trihydrate product (after separation of the proportion of fines required for seed) is in the form of fines, i.e., particles below 44 microns, which leads to increase in the partially dehydrated fines recovered from the exhaust gases of the calcination apparatus. It should be noted that owing to breakdown of particles in the calciner a precipitator trihydrate product containing 6% by weight of -44 microns size particles will typically result in a product having 10% or more -44 microns size particles after calcination (including the added-back collected fines). The use of precipitation conditions which lead to a larger portion of fines in the calciner output is much more acceptable when these fines (or a large proportion of them) are collected and converted into granules by compaction procedures.

In the accompanying drawing there is shown diagrammatically an alumina production plant for operation in accordance with the present invention.

In a conventional Bayer process alumina plant moist alumina trihydrate from the precipitation stage is fed in at 1 to the upper end of an inclined rotary furnace 2 and a calcined alumina product is drawn off at 3. Fuel and air are injected into the bottom end of furnace 2 at 4 and in consequence a very large volume of gas is exhausted from the upper end of the furnace. The exhaust is led into a first stage dust collection system 5, which separates out about 95% of the solids entrained in the exhaust gases. These particles are fed back into the feed end of the calciner furnace.

The exhaust from the first stage collection system 5 is led into a second stage collection system 6 composed of multicyclone separators, in which partially dehydrated fines, largely in the sub-44 micron size range are collected under more severe gravitational conditions than in the first stage. The exhaust from the second stage 6 may then be passed to an electrostatic precipitator 7 before discharge to atmosphere via a stack 8. The electrostatic precipitator collects particles of a size essentially below 33 microns. These typically have a water content of 17 - 22% because they have had a shorter residence in the calciner. In some cases it would be convenient to combine the second stage separation and the electrostatic precipitator into a single electrostatic precipitation stage.

The system, as so far described, is conventional. In conventional practice the partially dehydrated particles collected in the second stage and representing 3 - 5% of the alumina fed to the rotary furnace 2, would be combined with the calcined alumina output from the lower end of the furnace. The much finer particles collected in the electrostatic precipitator 7 would in some cases be mixed with the product or in other cases be returned to the Bayer process.

However in accordance with the present invention the partially dehydrated alumina particles from the second stage 6 and electrostatic separator 7 are conveyed to a feed bin 9 where primary de-aeration occurs. It is an important feature of the invention that the collected fines should be thoroughly de-aerated in the feed bin 9 and be passed without reaeration to a feed hopper 10 where de-aeration is completed with the assistance of a tapered feed screw 11 before it is fed into a standard roller-type compacter 12, which converts it into hard flakes under operating conditions already discussed above. Although other de-aeration means are obviously possible it has been found that the retention of the particles for a period of at least 30 minutes in a bed of about 60 - 120 cms depth achieves adequate de-aeration in a continuous process, in which the second stage separator particles are fed in a continuous stream to the bin.

The flakes fall from the compacter 12 into the rotating cage of a granulator 14, in which they are broken up by means of a contra-rotating knife. The material, formed by the disintegration of the flakes in the granulator 14, is conveyed by a bucket elevator 15 to a series of sieves 16, which is effective to separate the oversize particles and return them via 17 to the granulator 14 and to separate undersize particles and return them via 18 to the compacter 12.

In one system intended to compact 4 - 5 tons/day of collected fines a Komarek-Greaves Type 25CS9-3 compacter was found suitable in conjunction with a Komarek-Greaves granulator Model 16-12.

The product granules, lying in the size range 2362 - 220 microns (or other selected particle size range) are conveyed to a storage bin 19, from whence they are conveyed by a conveyor 20 to any form of transport 21 to the eventual electrolytic reduction plant.

As will be understood from the earlier discussion, the granules may be directly re-admixed with the product from the rotary furnace 2 or may be kept separate. It will be recognized that in either event the content of partially dehydrated alumina dust in the calcined alumina product is substantially reduced as compared with the output of a standard alumina calcination system, operating with the same alumina trihydrate input.

Extensive tests have been made to establish the suitability of the compacted granules of partially dehydrated alumina as a feed material for electrolytic reduction cells as a partial substitute for normal calcined alumina.

EXAMPLE 1

The normal feed material for two electrolytic reduction cells was 2000 lbs per day of calcined alumina having a moisture content of 1 - 2%. In one series of tests part of the alumina fed to one cell was replaced by 200 lbs per day of compacted multiclone dust granules, forming 10% of the feed to the cell, while 1000 lbs per day of granules and 1000 lbs per day of normal alumina was fed to the other cell. Both cells continued to operate normally for 33 days. The proportion of compacted dust granules fed to the second cell was then increased to 1500 lbs per day (75% of the total feed to the cell). The cell continued to operate satisfactorily except that more vapor was released during crust-breaking than was observed in normal operation (operation with normal calcined alumina). It was therefore concluded that granules of compacted partially dehydrated alumina fines should not form more than 50% of the alumina feed to the cell on a regular basis, although accidental excess would not cause malfunction of the cell.

In both cells the consumption of $AlF_3$ did not fall outside the range of consumption to be expected in normal operation of the cell. The purity of the produced metal, including the iron and silicon levels, was also normal. There were some indications that the use of compacted granules was serving to increase the useful life of the cell lining.

EXAMPLE 2

In a further series of tests two identical lines of reduction cells were employed. The cells of Line A were supplied with approximately 2000 lbs per day of normal calcined alumina (including about 5% of partially dehydrated added-back dust). The cells of Line B were supplied with approximately 1900 lbs per day of calcined alumina (free of collected dust) and 100 lbs per day of compacted second stage separator dust granules in the size range of 8 to 65 mesh (2362 – 220 microns). The compacted dust granules were thus added in an amount corresponding to the amount of added-back dust present in normal calcined alumina, as produced in a rotary kiln.

In a prolonged series of tests it was found that there was no statistically significant difference in HF losses between Line A and Line B.

Measurements were made on the emission from the cells in each line and the following results were obtained:

| Item | Particulate and Gaseous Emissions | Line A (Normal) | Line B (Test) |
|---|---|---|---|
| Total particulate | : lb/cell/day (kg) | 44.2 (20.5) | 26.3 (11.95) |
| Gaseous Fluorine | : lb/cell/day (kg) | 13.6 (6.16) | 12.4 (5.62) |
| Free $Al_2O_3$ | : lb/cell/day (kg) | 11.4 (5.15) | 4.9 (2.22) |
| Al ion (as $Al_2O_3$) | : lb/cell/day (kg) | 18.1 (8.2) | 8.7 (3.95) |
| $SO_2$ | : lb/cell/day (kg) | 28.1 (12.7) | 26.5 (12.0) |
| Exhaust Rate | : *SCFM/cell | 2724 (77.3) | 2432 (68.8) |

*SCFM = standard cubic feet/min.

It will be seen that there is a very significant decline in the emission of total particulates from the cell and in particular there is a significant decline in the emission of alumina dust (free $Al_2O_3$).

There was no significant difference in other important operating parameters, such as current efficiency and cell voltage.

I claim:

1. A method for the production of aluminium by the electrolytic reduction of alumina, including the steps of
   (a) feeding alumina to an electrolytic reduction cell and
   (b) passing direct electric current through said cell for reducing the alumina; wherein the improvement comprises
   (c) the feeding step comprising feeding, to said cell, alumina comprising calcined alumina particles and from 2 – 50% by weight of granules formed of compacted alumina particles, said particles being particles collected from the exhaust gases issuing from a calcination furnace incident to calcination of alumina trihydrate therein and having a major proportion by weight of particles of a size less than 44 microns, said granules having a size in the range of 5000 – 150 microns.

2. A method according to claim 1 further characterized in that the granules are in the size range 2362 – 220 microns.

3. A method according to claim 1 further characterized in that the granules comprise 2 – 10% by weight of the alumina supplied to the cell.

4. A method according to claim 1 further characterized in that the granules have a combined water content in the range of 5 – 25% dry weight.

5. A method according to claim 1 further characterized in that in operating a group of electrolytic reduction cells the proportion of granules fed to the cells is controlled in accordance with the purity of the metal yielded by the individual cells, a larger proportion of granules being supplied to the cells yielding the lower purity metal.

6. In the process of the production of aluminum from aluminous ores including the steps of precipitating alumina trihydrate from aqueous medium, calcining the alumina trihydrate in a calcination furnace to produce a calcined alumina product essentially free of combined water, collecting finely divided alumina particles from the exhaust gases issuing from the calcination furnace, and reducing calcined alumina to aluminium metal in an electrolytic reduction cell the improvement which consists in separating from said exhaust gases a body of alumina particles having a major proportion by weight of particles of a size less than 44 microns and forming said particles into compacted granules in a size range of 150 – 5000 microns and supplying said compacted granules to said electrolytic reduction cell in an amount of up to 50% of the total alumina supplied to the cell.

7. The process of claim 6 in which the collected particles have a combined water content in the range of 5 – 25%.

8. The process as claimed in claim 6 in which the compacted granules are admixed with calcined alumina product in preselected proportions before supply to an electrolytic reduction cell.

9. The process as claimed in claim 7 in which the collected fine particles are admixed with fully calcined alumina product before compaction.

10. The process as claimed in claim 6 further including supplying a stream of said collected alumina particles to a roller-type compacter, forming said particles into a continuous sheet, disintegrating said sheet to form granules of compacted particles, classifying said granules to obtain a product having granules within a preselected size range, returning sub-size granules to the compacter and returning over-size granules to the disintegrating stage.

11. A process according to claim 10 in which the collected finely divided alumina particles are subjected to a pressure of 15 – 25 tons/square inch in the roller-type compacter.

12. A process according to claim 6 in which the product granules lie in a size range of 220 – 2362 microns.

* * * * *